US009098559B2

(12) United States Patent
 Muenkel

(10) Patent No.: US 9,098,559 B2
(45) Date of Patent: Aug. 4, 2015

(54) OPTIMIZED VISUALIZATION AND ANALYSIS OF TABULAR AND MULTIDIMENSIONAL DATA

(75) Inventor: Christian Muenkel, Schelmengrubweg (DE)

(73) Assignee: SAP SE, Walldorf (DE)

( * ) Notice: Subject to any disclaimer, the term of this patent is extended or adjusted under 35 U.S.C. 154(b) by 1310 days.

(21) Appl. No.: 11/849,153

(22) Filed: Aug. 31, 2007

(65) Prior Publication Data

US 2009/0058867 A1   Mar. 5, 2009

(51) Int. Cl.
 *G06T 11/20* (2006.01)
 *G09G 5/00* (2006.01)
 *G06F 17/30* (2006.01)

(52) U.S. Cl.
 CPC ........ *G06F 17/30572* (2013.01); *G06T 11/206* (2013.01)

(58) Field of Classification Search
 CPC .................... G06F 17/30572; G06F 17/30716; G06F 17/30719; G06F 17/30126; G06F 17/30994; G06F 19/26; G06F 19/708; G06T 11/206
 USPC ........................................................ 345/440
 See application file for complete search history.

(56) References Cited

U.S. PATENT DOCUMENTS

| 5,016,170 | A  | * | 5/1991  | Pollalis et al. ................ 345/440 |
| 6,188,403 | B1 | * | 2/2001  | Sacerdoti et al. ............. 345/440 |
| 6,222,540 | B1 | * | 4/2001  | Sacerdoti ...................... 345/440 |
| 6,222,547 | B1 | * | 4/2001  | Schwuttke et al. ........... 345/440 |
| 6,972,762 | B2 | * | 12/2005 | Ben-Tovim et al. .......... 345/440 |
| 7,023,440 | B1 | * | 4/2006  | Havekost et al. ............. 345/440 |
| 2004/0164983 | A1 | * | 8/2004  | Khozai ......................... 345/440 |
| 2004/0243593 | A1 | * | 12/2004 | Stolte et al. ................... 707/100 |
| 2005/0060300 | A1 | * | 3/2005  | Stolte et al. ....................... 707/3 |
| 2005/0177790 | A1 | * | 8/2005  | Molander et al. ............. 345/440 |
| 2006/0028470 | A1 | * | 2/2006  | Bennett et al. ................ 345/440 |
| 2006/0206512 | A1 | * | 9/2006  | Hanrahan et al. ............. 707/102 |
| 2008/0133567 | A1 | * | 6/2008  | Ames et al. ................... 707/102 |

\* cited by examiner

*Primary Examiner* — Jeffery A Brier
(74) *Attorney, Agent, or Firm* — Mintz Levin Cohn Ferris Glovsky and Popeo, P.C.

(57) ABSTRACT

A system and method for generating a display of a dataset for optimized visualization of the dataset are disclosed. A data area of the display is defined. The data area includes two or more dimensions, the intersection of which defines a graphical object having a set of visual attributes. One or more of the set of visual attributes of each graphical object in the data area is modified based on a value associated with each graphical object relative to a user-selectable measure.

17 Claims, 6 Drawing Sheets

OPTIMIZED VISUALIZATION AND ANALYSIS OF TABULAR AND MULTIDIMENSIONAL DATA

BACKGROUND

This disclosure relates generally to database analysis tools, and more particularly to a system and method for visualization and analysis of tabular and multidimensional data.

Data stored in relational or multidimensional databases or files often represents a huge amount of information. The information, and therefore the data that represents it, is often difficult to analyze on such large scales. Finding the most important and/or relevant parts of that data is usually difficult, and the relations among the data is typically non-intuitive. Using traditional database analysis tools to find important, relevant, and relative data is at best slow, and usually impossible for an accurate result.

SUMMARY

In general, this document discusses a system and method for generating a display of tabular and multi-dimensional data of a dataset, and for processing the display for optimized visualization of the dataset.

In some aspects, a system and method of generating a display of a dataset includes defining a data area of the display, the data area including two or more dimensions, the intersection of which defines a graphical object having a set of visual attributes. The system and method further includes modifying one or more of the set of visual attributes of each graphical object in the data area based on a value associated with each graphical object relative to a user-selectable measure.

In other aspects, a system and method of generating a display of a dataset includes executing the step of providing a data area within a graphical display, the data area including two or more dimensions, the intersection of which defines a graphical object, the graphical object having a value based on a user-selectable measure. The system and method further include executing the steps of defining a set of visual attributes for the graphical object based on the value, and applying the set of visual attributes to each graphical object in the data area to generate a visualization of the dataset.

In yet other aspects, a system and method of generating a display of a dataset includes modules executing the steps of generating a graphical display for display in a graphical user interface, and defining a data area within the graphical display, the data area including two or more dimensions that define an array of graphical objects, each graphical object having a value according to one of a group of measures. The system and method further include a step of defining a set of visual attributes for the graphical object based on the value, and a step of applying the set of visual attributes to each graphical object in the data area to generate a visualization of the dataset in the graphical display.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The importance of certain data in datasets and their relations is visualized, i.e. generated by a computer processor and represented in a graphical user interface, in certain ways, and having visual attributes that can be modified interactively and easily. Accordingly, a user can quickly and intuitively assess an importance of a value of data in any dataset according to any measure.

Figure 1:
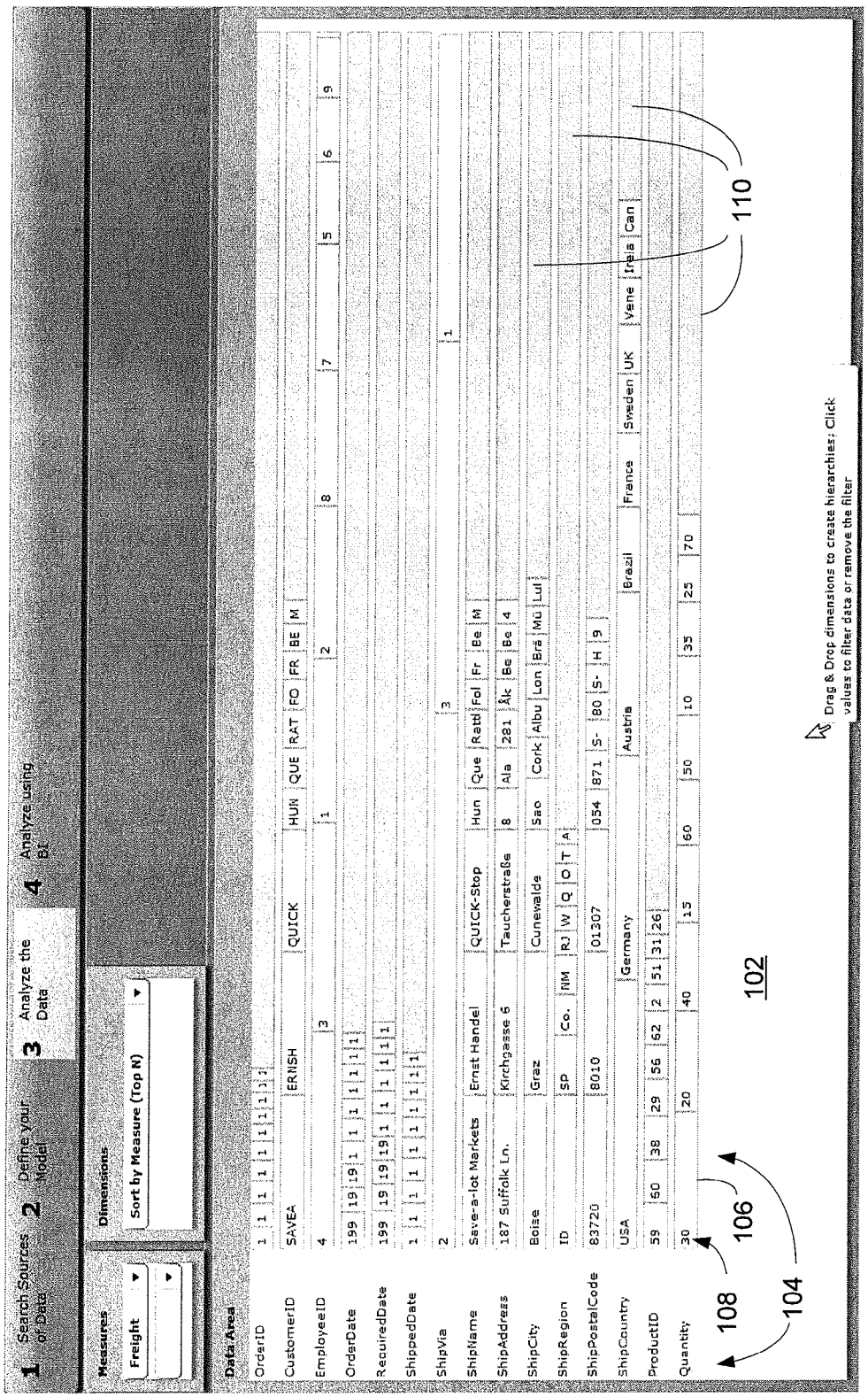
FIG. 1 illustrates a graphical display that includes a data area to display a dataset.

FIG. 1 illustrates a graphical display 100 that includes a display of a dataset 102, which in turn is represented as a set of dimensions 104 such as a number of columns and rows, for a two-dimensional tabular arrangement, such that each box 106 formed by a column/row is associated with a value 108. The box 106 is defined by one or more visual attributes, such as height, width, color, shading, etc. In some implementations, each row can have a different number of columns. The graphical display 100 can be provided in a graphical user interface on a digital display such as a computer monitor, handheld device digital display, etc. In an exemplary implementation, in the graphical display 100 of all dimensions 104 (i.e. columns) of the dataset 102, the size of each individual box 106 represent the importance of its associated value with respect to a certain measure (KPI, key performance indicator).

Figure 2:
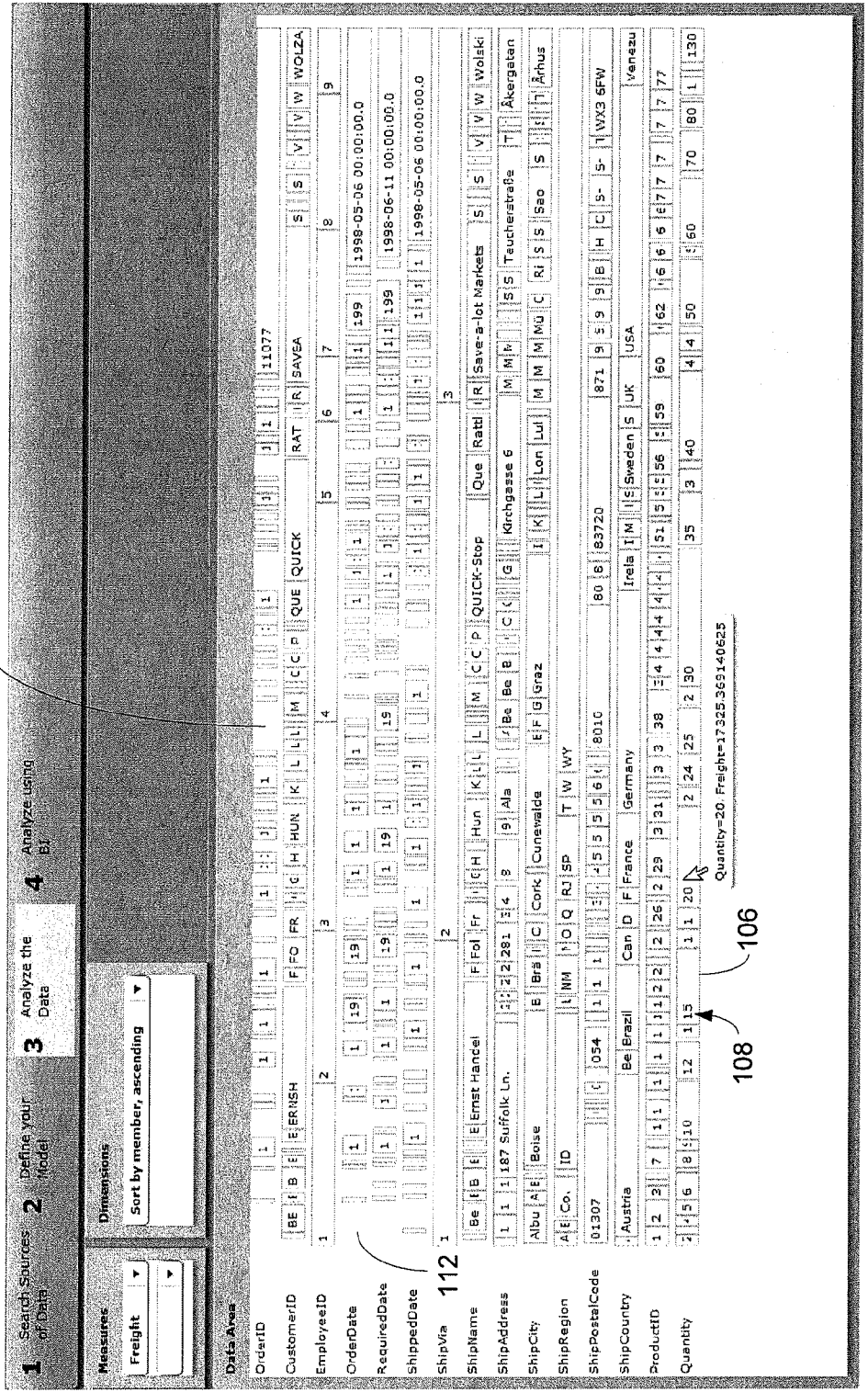
FIG. 2 illustrates the graphical display being visually modified based on a different sorting of a dimension.

The values can be sorted in different ways. As shown in FIG. 1, the graphical display 100 of the dataset 102 can be generated to sort the values according to the top N values, i.e., those with the most contribution according to a selected measure. Other sort criteria may be used. For example, dimensions 104 on the graphical display 100 can also be manipulated according to a "drag and drop" operation, i.e. input commands from a user input device to a computer that causes the computer to manipulate the graphical display 100 to represent, and then process, a graphical object being "dragged" from one location in the graphical display 100 to a second location, and "dropped" and repositioned at that second location. Values 108 in the boxes 106 can be "clicked" or selected to filter data or remove the filter. As shown in FIG. 2, values 108 can also be sorted by the values of the dimensions themselves. The less important data need not be shown in detail, to enable the user to focus immediately on the most relevant data. Non important data parts can be put into a field 110 labeled "others" or another general name, as shown in FIG. 1, or the space is left as a blank space 112 as shown in FIG. 2.

Figure 3:
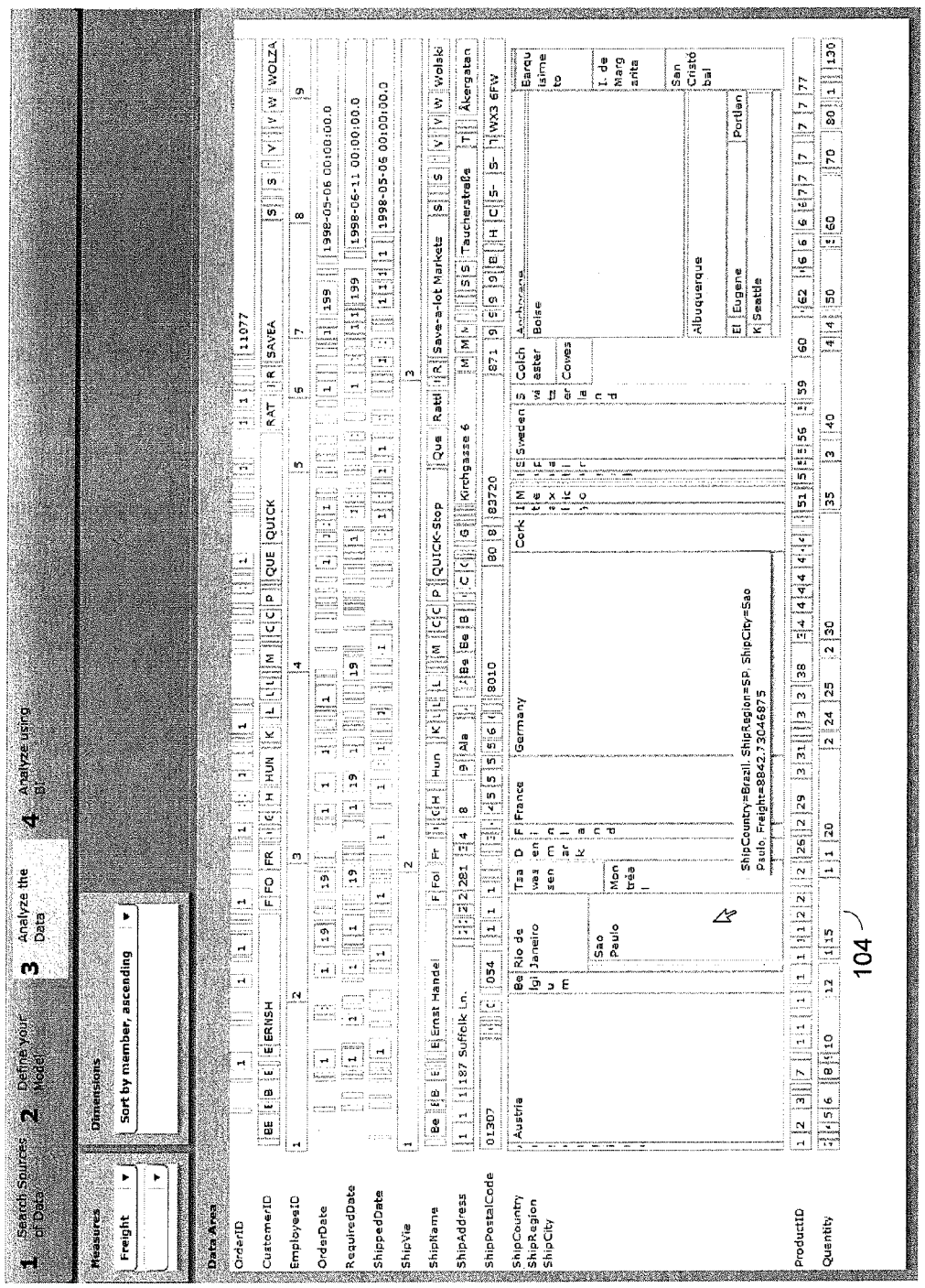
FIG. 3 illustrates the graphical display being further visually modified based on having a certain hierarchical relation between dimensions.

A dimension 104 of the dataset 102 area (i.e. one or more columns) can be manipulated on or against another dimension by a "drag and drop" operation by a user. That dimension 104 is then removed from the graphical display 100, and both are shown as a common relationship with respect to a selected measure. This is especially useful for dimensions 104 having a certain hierarchical relation, such as, for example, country, region, city, etc. As shown in FIG. 3, the value of the measure with respect to the first dimension 104 is used to determine the horizontal size of the boxes 106, and the value for the other dimension 104 is used to determine a vertical size within each of the boxes 106. Horizontal and vertical orientation of the dimensions 104 can be alternated, and this technique can be applied for any number of dimensions. A sorting criteria, especially the Top N visualization, leads to an immediate impression of the most important data and their relations, because the number of displayed boxes is limited by number and the most important ones.

Figure 4:
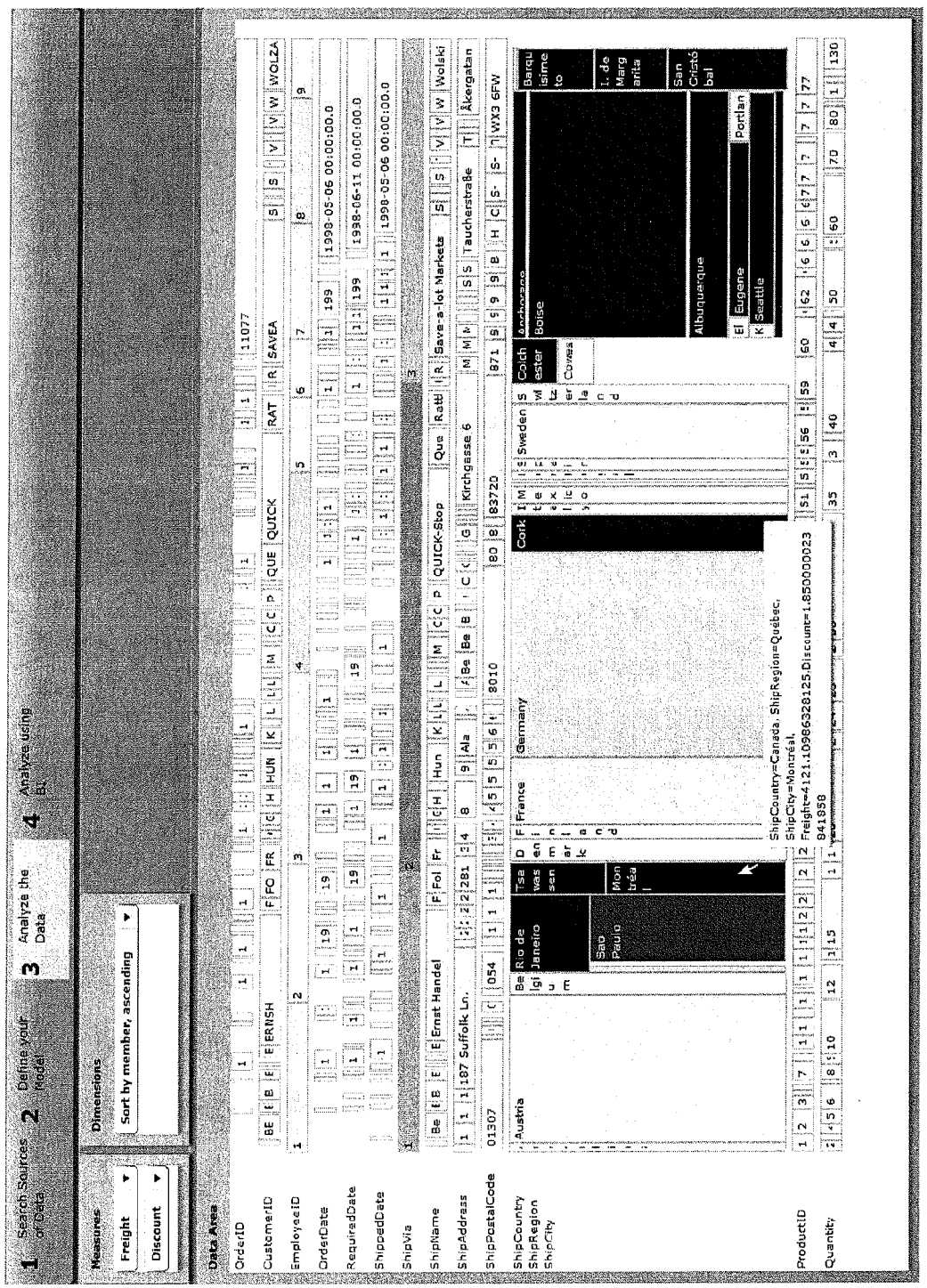
FIG. 4 illustrates the graphical display of multiple measures simultaneously.
Figure 5:
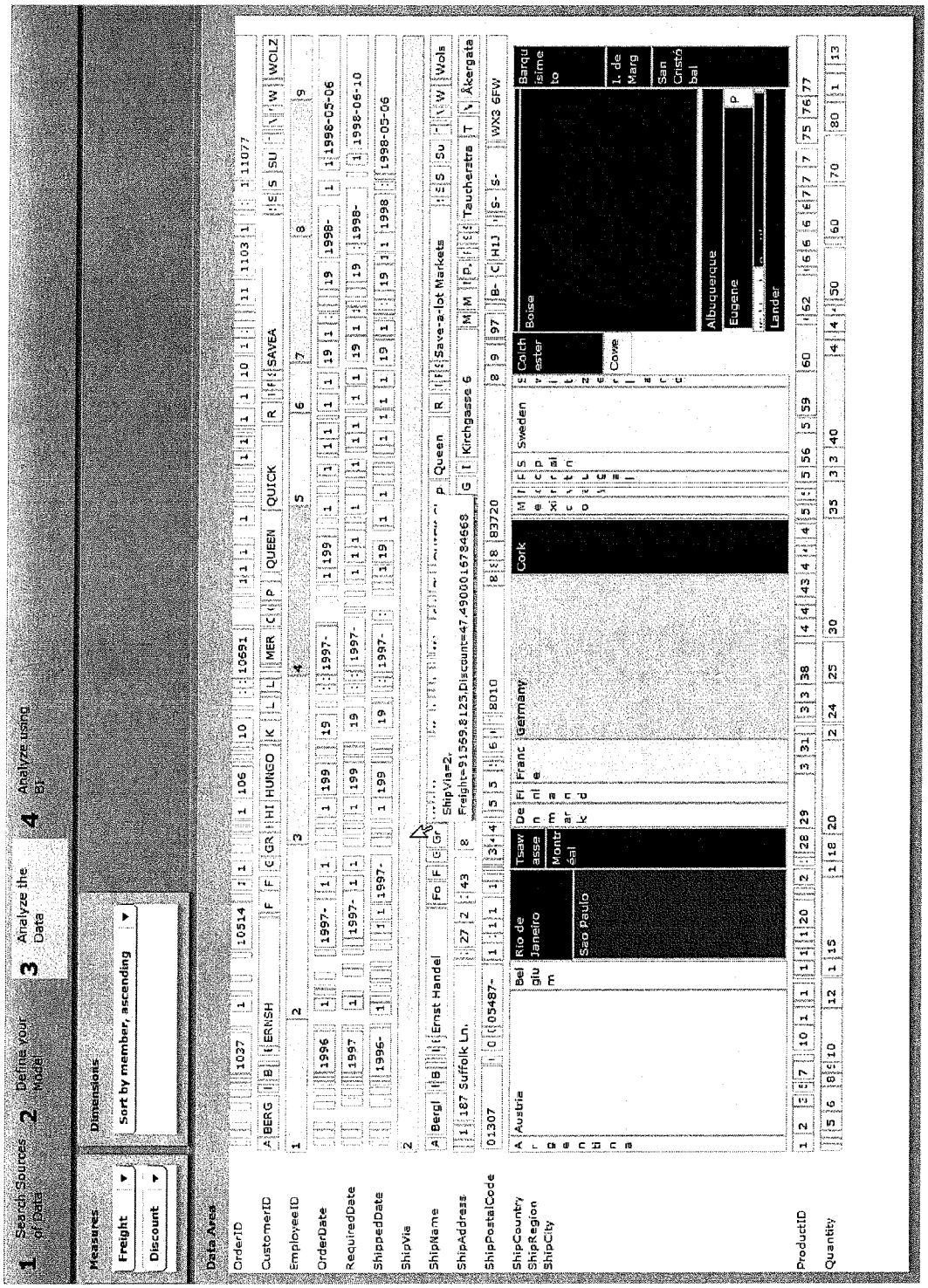
FIG. 5 illustrates the graphical display according to a filtering technique.

As shown in FIG. 4, more than one measure (i.e. KPI) can be visualized simultaneously by a) a size of the boxes, b) a color or shadowing and intensity of the box background, c) a height of a line or symbol displayed in the box, and/or other visual effects. FIG. 4. Other visual effects can include blinking, movement, or a changing of colors. Further, as shown in FIG. 5, when a box 106, which represents a certain value, is selected, a global filter can set for all data shown. Another selection input such as a "click" on the box removes that filter. Therefore the user can easily and efficiently focus on a certain subset of the data in the dataset 102.

Figure 6:
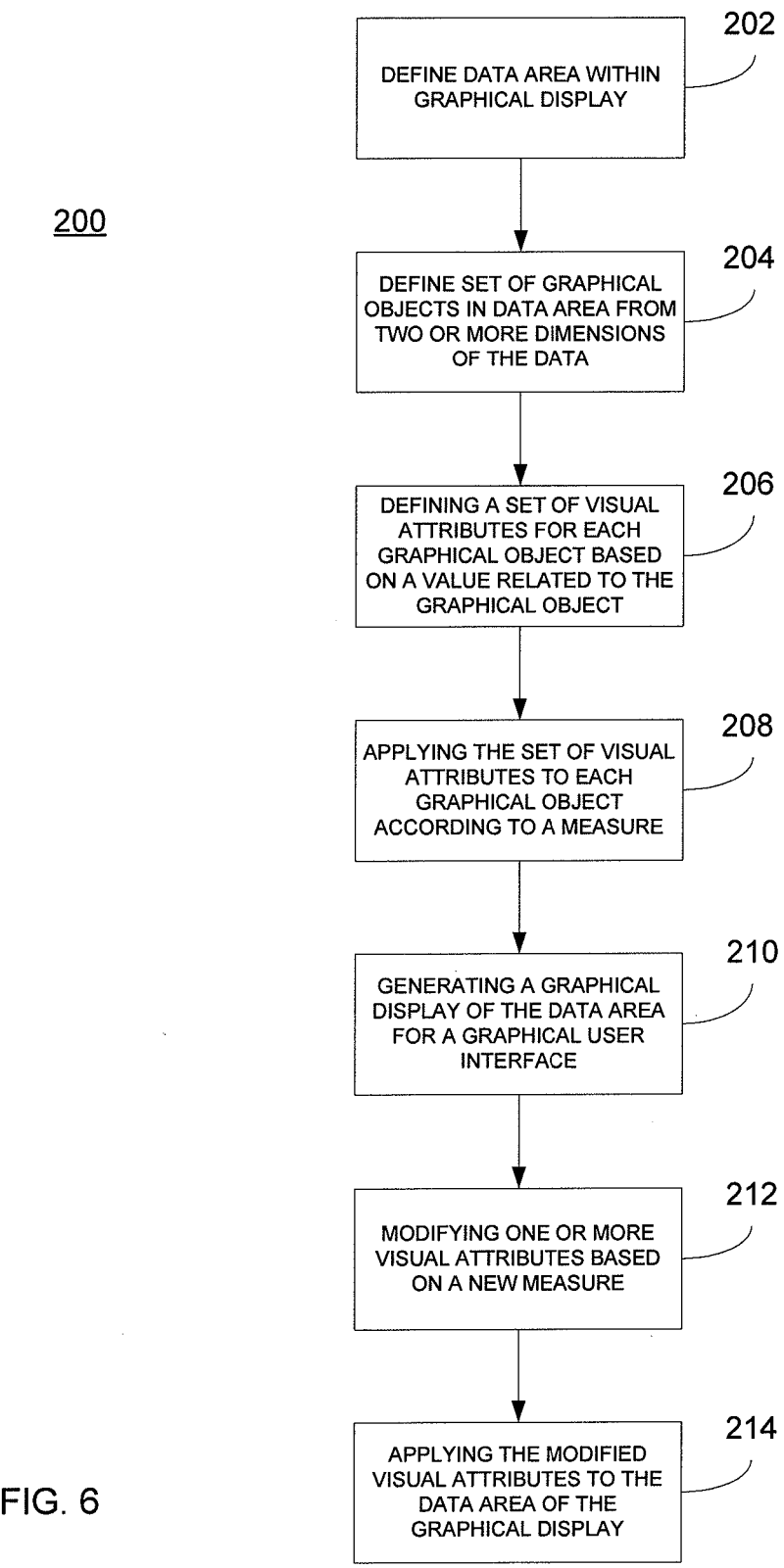
FIG. 6 illustrates a method of generating a display of a dataset.

FIG. 6 illustrates a method 200 of generating a display of a dataset, as depicted in FIGS. 1-5. Those having skill in the art would recognize that the method 200 need not be executed in any particular order, such as the order shown, to achieve desirable and advantageous results. At 202, a data area is defined within a graphical display. At 204, a set of graphical objects are defined in the data area. The graphical objects are formed from the intersection of two or more dimensions, such as column, row, etc. In some implementations, each graphical object is a shape, such as a box. The graphical objects can be any shape, however.

At 206, a set of visual attributes are defined for each graphical object. The visual attributes, such as size, color, shading, etc., are based on a value related to the graphical object. For example, the graphical object may represent a numerical value associated with a measure. At 208, the set of visual attributes are applied to each graphical object according to a measure. There is any number of measures, which are user-selectable criterion for sorting the values associated with the graphical objects. At 210, a graphical display of the data area is generated for being displayed in a graphical user interface.

At 212, one more of the visual attributes are modified based on a new measure. In one example, a user can "click" on a graphical object to filter all other graphical objects according to the new measure. At 214, the modified visual attributes are applied to the data area of the graphical display. For example, a number of graphical objects can be resized, or have a background color changed, according to the new measure, and the modified visual attribute changes the look of the graphical display in the graphical user interface. Accordingly, a user is presented with a graphical display that immediately and intuitively indicates an importance of the data in the dataset based on which ever measure the user selects.

Some or all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer readable medium, e.g., a machine readable storage device, a machine readable storage medium, a memory device, or a machine-readable propagated signal, for execution by, or to control the operation of, data processing apparatus.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also referred to as a program, software, an application, a software application, a script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to, a communication interface to receive data from or transfer data to, or both, one or more mass storage devices for storing data, e.g., magnetic, magneto optical disks, or optical disks.

Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Particular embodiments of the invention have been described. Other embodiments are within the scope of the following claims. For example, the steps recited in the claims can be performed in a different order and still achieve desirable results. In addition, embodiments of the invention are not limited to database architectures that are relational; for example, the invention can be implemented to provide indexing and archiving methods and systems for databases built on models other than the relational model, e.g., navigational databases or object oriented databases, and for databases having records with complex attribute structures, e.g., object oriented programming objects or markup language documents. The processes described may be implemented by applications specifically performing archiving and retrieval functions or embedded within other applications.

What is claimed:

1. A computer-implemented method comprising:
    defining, by at least one data processing apparatus, a data area of a graphical user interface, the data area having at least one dimension, the graphical user interface displaying a plurality of text boxes that are associated with respective visual attributes of a plurality of visual attributes, the visual attributes comprising blinking and change of colors associated with at least one text box of the plurality of text boxes;
    receiving, by at least one data processing apparatus and from a user, a key performance indicator displayed on the graphical user interface;
    modifying, by at least one data processing apparatus, a value of the at least one dimension of the data area of the graphical user interface when the at least one text box having a visual attribute based on the key performance indicator is dragged and dropped on the graphical user interface, the visual attribute being one of the plurality of visual attributes; and
    generating, by at least one data processing apparatus, an arrangement associated with the value of the at least one data dimension that has been modified when the at least one text box has been dragged and dropped on the graphical user interface, the arrangement being displayed on the graphical user interface.

2. A method in accordance with claim 1, wherein the key performance indicator comprises freight data and discount data associated with a shipping of a product, the freight data and the discount data being calculated based on at least one date associated with the shipping of the product.

3. A method in accordance with claim 1, wherein:
    the visual attributes further comprise a size of the at least one text box; and
    the modified value of the at least one data dimension characterizes a new size of the at least one text box.

4. A method in accordance with claim 3, wherein the size of the at least one text box includes a width of the text box and a height of the text box.

5. A method in accordance with claim 1, wherein the visual attributes further comprise a background color of at least one text box, and wherein the one or more modified visual attributes comprise a modified background color of the at least one text box.

6. A method in accordance with claim 1, wherein the key performance indicator comprises freight and discount associated with a shipping of a product, the freight and the discount being determined based on a combination of a date of placing an order of a product, a required date of delivery of the order, an identifier of a carrier of the order via which the order is desired to be shipped, postal address of a location of delivery, the product in the order, and a quantity of the product in the order.

7. A computer-implemented method of generating a display of a dataset, the method comprising:
    providing, by at least one data processing apparatus, a data area within a graphical display, the data area including at least one dimension, the intersection of which defines a two-dimensional graphical object, the graphical object having a value based on a user-selectable measure;
    defining, by at least one data processing apparatus, a set of visual attributes for the graphical object based on the value, the set of visual attributes comprising a blinking of the graphical object and a movement of the graphical object;
    applying, by at least one data processing apparatus, the set of visual attributes to each graphical object in the data area to generate a visualization of the dataset; and
    modifying, by at least one data processing apparatus when the graphical object is dragged and dropped on the graphical display, a value of the at least one data dimension associated with the visualization of the dataset.

8. A method in accordance with claim 7, further comprising applying, by at least one data processing apparatus, the modified set of visual attributes to each graphical object in the data area to generate a new visualization of the dataset.

9. A method in accordance with claim 7, further comprising filtering, by at least one data processing apparatus, data in the dataset based on user-selected criteria.

10. A method in accordance with claim 7, wherein the set of visual attributes includes a size of the each graphical object.

11. A method in accordance with claim 7, wherein the set of visual attributes includes a background color of the each graphical object.

12. A method in accordance with claim 7, wherein each graphical object is represented as a text box, the text box being a graphical object that displays text.

13. A method in accordance with claim 12, wherein the set of the visual attributes of the text box includes a height of the text box and a width of the text box.

14. A computer-implemented method of generating a display of a dataset, the method comprising:
  generating, by at least one data processing apparatus, a graphical display for display in a graphical user interface;
  defining, by at least one data processing apparatus, a data area within the graphical display, the data area including at least one dimension defining an array of graphical objects, each graphical object having a value according to at least one of a plurality of measures, the plurality of measures characterizing an importance of display of the graphical object;
  defining, by at least one data processing apparatus, a set of visual attributes for the graphical object based on the value, the set of visual attributes comprising a blinking of the graphical object;
  applying, by at least one data processing apparatus, the set of visual attributes to each graphical object in the data area to generate a visualization of the dataset in the graphical display; and
  modifying, by at least one data processing apparatus, a value of the at least one data dimension associated with the visualization of the dataset when a graphical object of the array of graphical objects is dragged and dropped on a portion of the graphical display, the graphical object having a visual attribute based on a key performance indicator specified by a user of the graphical user interface.

15. A method in accordance with claim 14, wherein the dataset is retrieved from a multidimensional, relational or other database.

16. A method in accordance with claim 15, wherein the graphical display is generated by a computer having a communication link with the multidimensional, relational or other database.

17. A method in accordance with claim 14, wherein the plurality of measures is associated with one of more of: a date of placing an order of a product, a required date of delivery of the order, an identifier of a carrier of the order via which the order is desired to be shipped, postal address of a location of delivery, the product in the order, and a quantity of the product in the order.

* * * * *